(12) United States Patent
Bugarin et al.

(10) Patent No.: US 7,233,917 B2
(45) Date of Patent: Jun. 19, 2007

(54) PRODUCT SELECTION OVER A COMMUNICATION NETWORK

(75) Inventors: John R. Bugarin, Fort Collins, CO (US); James F. Mackin, III, Louisville, CO (US)

(73) Assignee: Micro Motion, Inc., Boulder, CO (US)

( * ) Notice: Subject to any disclaimer, the term of this patent is extended or adjusted under 35 U.S.C. 154(b) by 745 days.

(21) Appl. No.: 09/845,149

(22) Filed: Apr. 30, 2001

(65) Prior Publication Data

US 2002/0161459 A1 Oct. 31, 2002

(51) Int. Cl.
*G06F 17/30* (2006.01)
(52) U.S. Cl. ...................................................... 705/27
(58) Field of Classification Search ................ 705/27, 705/26; 345/1.1, 1.2, 2.2, 3.1; 706/46, 55, 706/925; 707/3–6, 102; 715/817–825, 9; 709/220, 203, 221
See application file for complete search history.

(56) References Cited

U.S. PATENT DOCUMENTS

| | | |
|---|---|---|
| 5,008,810 A | 4/1991 | Kessel et al. |
| 5,367,619 A | 11/1994 | Dipaolo et al. |
| 5,550,746 A | 8/1996 | Jacobs |
| 5,592,378 A | 1/1997 | Cameron et al. |
| 5,745,712 A | 4/1998 | Turpin et al. |
| 5,758,095 A | 5/1998 | Albaum et al. |
| 5,825,651 A | 10/1998 | Gupta et al. |
| 5,895,454 A | 4/1999 | Harrington |
| 6,008,808 A | 12/1999 | Almeida et al. |
| 6,035,305 A | 3/2000 | Strevey et al. |
| 6,052,669 A | 4/2000 | Smith et al. |

(Continued)

FOREIGN PATENT DOCUMENTS

KR 1020000029451 5/2000

(Continued)

OTHER PUBLICATIONS

Attardi, Giuseppe, et al., "Web-based Configuration Assistants," Dipartimento di Informatica, Universita di Pisa, Italy XP002902516 (Sep. 1998) pp. 1-12.

*Primary Examiner*—Ronald Laneau
(74) *Attorney, Agent, or Firm*—The Ollila Law Group LLC

(57) ABSTRACT

A server system directs product selection over a communication network where screens are displayed to a user. The screens are arranged in a sequence. The server system processes user data from user input signals to determine if the user data is consistent with at least one of a plurality of products. The server system transfers a selected one of the screen signals corresponding to a selected one of the screens if the selected one of the screens is backward in the sequence or if all previous ones of the screens in the sequence prior to the selected one of the screens have the consistent data. The server system transfers to the user system over the communication network an earliest one of the screen signals corresponding to an earliest one of the screens in the sequence that does not have the consistent data if the selected one of the screens is forward in the sequence and if the previous ones of the screens in the sequence prior to the selected one of the screens do not all have the consistent data.

39 Claims, 13 Drawing Sheets

U.S. PATENT DOCUMENTS

| | | |
|---|---|---|
| 6,064,982 A | 5/2000 | Puri |
| 6,070,149 A | 5/2000 | Tavor et al. |
| 6,083,267 A | 7/2000 | Motomiya et al. |
| 6,086,377 A | 7/2000 | Pinder et al. |
| 6,125,352 A | 9/2000 | Franklin et al. |
| 6,125,353 A | 9/2000 | Yagasaki |
| 6,167,383 A | 12/2000 | Henson |
| 6,173,210 B1 | 1/2001 | Bjornson et al. |
| 6,282,518 B1 | 8/2001 | Farrell et al. |
| 2002/0107763 A1* | 8/2002 | Palmer et al. ............ 705/29 |

FOREIGN PATENT DOCUMENTS

| | | |
|---|---|---|
| WO | WO 00/46706 | 8/2000 |
| WO | WO 02/23425 | 3/2002 |

* cited by examiner

PRODUCT SELECTION OVER A COMMUNICATION NETWORK

BACKGROUND OF THE INVENTION

1. Field of the Invention

The invention is related to the field of communication network-based product selection, and in particular, to product selection using a sequence of screens.

2. Statement of the Problem

Many businesses have created web sites to allow their customers to purchase products on-line. The customer is able to browse through several products and product features, and then select the products and features that they desire. The customer provides payment information, and the company ships the selected products to the customer.

Special product selection software applications are used to drive on-line product selection. Under the control of this software, the web site downloads a sequence of web pages to the customer, and the customer inputs user data into the web pages and submits the web pages to the web site for product selection. To move from one web page to another, the customer indicates "next" or "back" when submitting the current web page.

As the customer submits the web pages in the sequence, the selected user data typically reduces customer choices on subsequent pages. This reduction of customer choices occurs because the selected user data eliminates products and product features that are inconsistent with previous selections. For example, if a customer is selecting features for a pick-up truck, an option for a special towing package may no longer be available if the customer has previously selected a smaller motor unsuitable for heavy towing. In this example, the customer would have to start over or keep hitting the "back" button until the motor selection page is retrieved.

To address this problem, a single web page has replaced the sequence of web pages. The single web page includes a list of check boxes and drop-down menus correlated with various products and features. The relationship between user data is indicated, and the customer may move up and down the single web page list to maintain consistency between selections. In the above example, the towing package selection might now include a parenthetical indicating that it requires the larger motor, and the large motor selection might now include a parenthetical indicating that it is required for the towing package.

Unfortunately, the customer is now faced with a lengthy list of inter-related products and features. The list can be confusing and intimidating to many customers. The prior sequenced approach allows the customer to build a product specification one step at a time, but as mentioned above, the sequenced approach is deficient because it can be difficult to move from one web page to another to maintain consistent user data.

SUMMARY OF THE SOLUTION

The invention helps solve the above problems with software products, server systems, and methods for facilitating product selection over a communication network. The user is presented with a sequence of screens that prompt the user for data that is used to select a product from a set of products. For each screen, the user data is processed to ensure consistency with previously input user data and at least one of the products. The user may easily jump back and forth among the screens in the sequence in an iterative process to build a set of consistent user data. Advantageously, the user may build the product specification one simple step at a time and avoid a lengthy and intimidating one-page checklist. Advantageously, the user may jump from one desired screen to another and avoid navigating through a rigid sequence of screens.

An aspect of the invention includes a software system for directing product selection over a communication network where a user system receives screen signals from the communication network and displays corresponding screens to a user. The user provides user inputs to the user system in response to the screens, and the user system transfers corresponding user input signals over the communication network. The screens are arranged in a sequence. The software system comprises user data software, screen control software, and a storage system that stores the user data software and the screen control software. The user data software is configured to direct a processing system to process user data from the user input signals to determine if the user data is consistent data that is consistent with at least one of a plurality of products. The screen control software is configured to direct the processing system to process user screen selections from the user input signals, transfer a selected one of the screen signals corresponding to a selected one of the screens if the selected one of the screens is backward in the sequence or if all previous ones of the screens in the sequence prior to the selected one of the screens have the consistent data, and to transfer to the user system over the communication network an earliest one of the screen signals corresponding to an earliest one of the screens in the sequence that does not have the consistent data if the selected one of the screens is forward in the sequence and if the previous ones of the screens in the sequence prior to the selected one of the screens do not all have the consistent data.

In an aspect of the invention, the screen control software is configured to direct the processing system to include in the screen signals the consistent data for a current one of the screens corresponding to a current one of the screen signals being transferred and the consistent data for earlier ones of the screens in the sequence.

In an aspect of the invention, the user data software is configured to direct the processing system to remove from product selection consideration non-selectable ones of the products that are inconsistent with the consistent data, and the screen control software is configured to direct the processing system to modify the screens signals to indicate user data selections that are inconsistent with selectable ones of the products that remain under product selection consideration.

In an aspect of the invention, the user data software is configured to direct the processing system to start with a pre-existing set of the consistent data.

In an aspect of the invention, the user data software is configured to direct the processing system to complete a purchase transaction for a selected one of the products.

In an aspect of the invention, the products comprise flow meters.

In an aspect of the invention, the products comprise Coriolis flow meters.

In an aspect of the invention, the products comprise densitometers.

In an aspect of the invention, the user data indicates a fluid name.

In an aspect of the invention, the user data indicates at least one of: fluid flow rate, fluid density, fluid viscosity, fluid pressure, and fluid temperature.

In an aspect of the invention, the user data indicates a flowmeter sensor type.

In an aspect of the invention, the user data indicates a flowmeter process connection type.

In an aspect of the invention, the user data indicates a flowmeter transmitter type.

An aspect of the invention includes a server system for directing product selection over a communication network where a user system receives screen signals from the communication network and displays corresponding screens to a user. The user provides user inputs to the user system in response to the screens, and the user system transfers corresponding user input signals over the communication network. The screens are arranged in a sequence. The server system comprises a network interface and a processing system. The network interface is configured to transfer the screen signals to the communication network and to receive the user input signals from the communication network. The processing system is configured to process user data from the user input signals to determine if the user data is consistent data that is consistent with at least one of a plurality of products, process user screen selections from the user input signals, transfer a selected one of the screen signals corresponding to a selected one of the screens if the selected one of the screens is backward in the sequence or if all previous ones of the screens in the sequence prior to the selected one of the screens have the consistent data, and to transfer to the user system over the communication network an earliest one of the screen signals corresponding to an earliest one of the screens in the sequence that does not have the consistent data if the selected one of the screens is forward in the sequence and if the previous ones of the screens in the sequence prior to the selected one of the screens do not all have the consistent data.

In an aspect of the invention, the processing system is configured to include in the screen signals the consistent data for a current one of the screens corresponding to a current one of the screen signals being transferred and the consistent data for earlier ones of the screens in the sequence.

In an aspect of the invention, the processing system is configured to remove from product selection consideration non-selectable ones of the products that are inconsistent with the consistent data, and modify the screens signals to indicate user data selections that are inconsistent with selectable ones of the products that remain under product selection consideration.

In an aspect of the invention, the processing system is configured to start with a pre-existing set of the consistent data.

In an aspect of the invention, the processing system is configured to complete a purchase transaction for a selected one of the products.

An aspect of the invention includes a method of operating a server system for directing product selection over a communication network where a user system receives screen signals from the communication network and displays corresponding screens to a user. The user provides user inputs to the user system in response to the screens, and the user system transfers corresponding user input signals over the communication network. The screens are arranged in a sequence. The method comprises: processing user data from the user input signals to determine if the user data is consistent data that is consistent with at least one of a plurality of products; processing user screen selections from the user input signals; transferring a selected one of the screen signals corresponding to a selected one of the screens if the selected one of the screens is backward in the sequence or if all previous ones of the screens in the sequence prior to the selected one of the screens have the consistent data; and transferring to the user system over the communication network an earliest one of the screen signals corresponding to an earliest one of the screens in the sequence that does not have the consistent data if the selected one of the screens is forward in the sequence and if the previous ones of the screens in the sequence prior to the selected one of the screens do not all have the consistent data.

In an aspect of the invention, the method further comprises including in the screen signals the consistent data for a current one of the screens corresponding to a current one of the screen signals being transferred and the consistent data for earlier ones of the screens in the sequence.

In an aspect of the invention, the method further comprises removing from product selection consideration non-selectable ones of the products that are inconsistent with the consistent data, and modifying the screens signals to indicate user data selections that are inconsistent with selectable ones of the products that remain under product selection consideration.

In an aspect of the invention, the method further comprises starting the method with a pre-existing set of the consistent data.

In an aspect of the invention, the method further comprises completing a purchase transaction for a selected one of the products.

DESCRIPTION OF THE DRAWINGS

The same reference number represents the same element on all drawings.

DETAILED DESCRIPTION OF THE INVENTION

FIGS. 1–13 and the following description depict specific examples of a server system to teach those skilled in the art how to make and use the best mode of the invention. For the purpose of teaching inventive principles, some conventional aspects of the server system have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
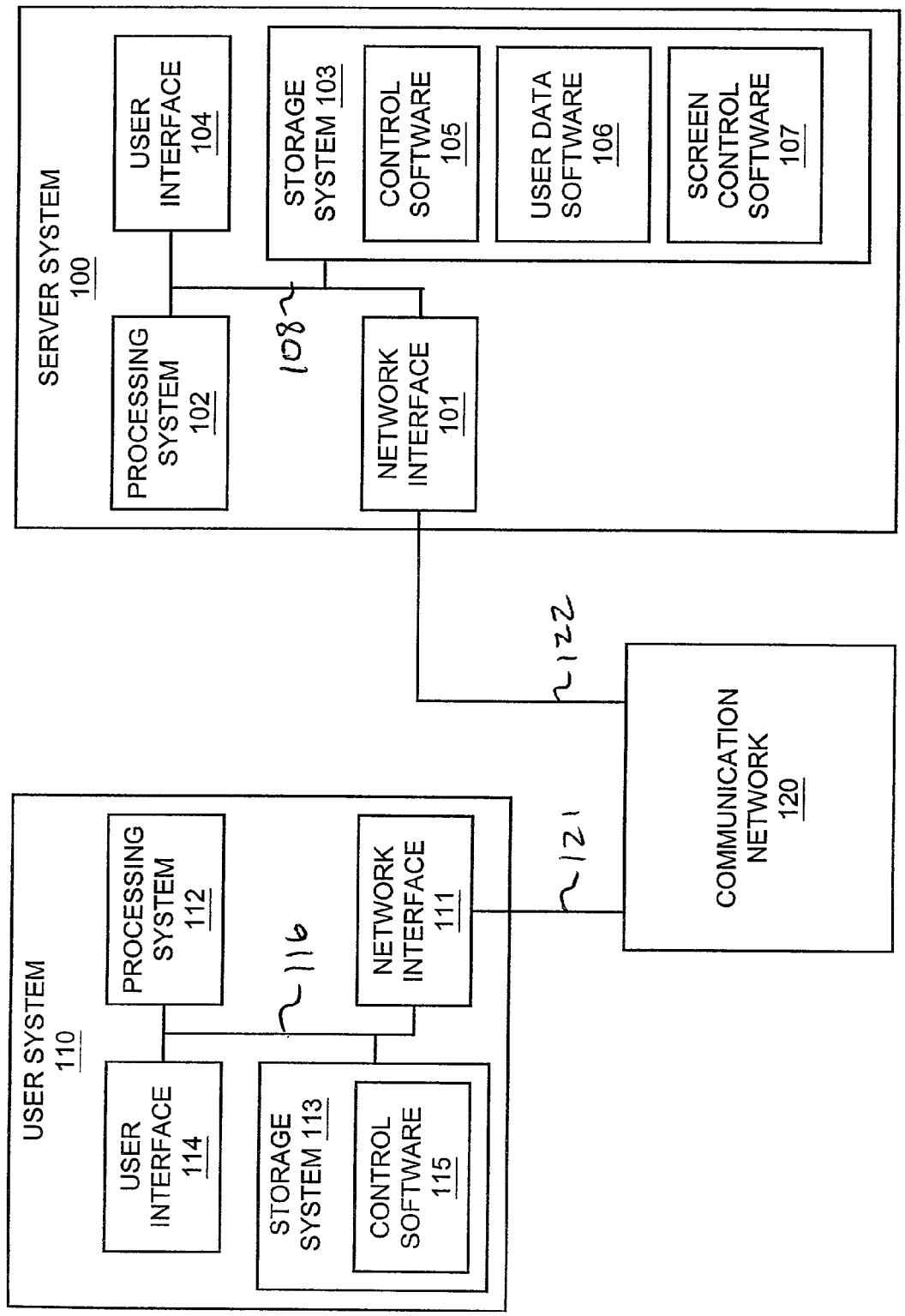
FIG. 1 illustrates a system configuration in an example of the invention.

System Configuration—FIG. 1

FIG. 1 illustrates a system configuration in an example of the invention. The system includes server system 100, user system 110, and communication network 120. Server system 100 and user system 110 communicate over communication network 120. User system 110 transfers user data to server system 100 in response to a sequence of screens from server system 100. One example of a screen is a web page. Server system 100 processes the user data to select a product that should be suitable for the user. The term "products" includes both tangibles and intangibles, as well as services. Although the screens are arranged in a sequence, server system 100 allows user system 110 to jump around among the screens while user data is being provided. Advantageously, the user may perform an iterative process that results in better product selection than prior systems.

Server system 100 includes network interface 101, processing system 102, storage system 103, user interface 104, and link 108. Storage system 103 stores control software 105, user data software 106, and screen control software 107. Link 108 allows processing system 102 to communicate with network interface 101, storage system 103, and user interface 104. Link 108 could be comprised of multiple communication paths using various media.

User system 110 includes network interface 111, processing system 112, storage system 113, user interface 114, and link 116. Storage system 113 stores control software 115. Link 116 allows processing system 112 to communicate with network interface 111, storage system 113, and user interface 114. Link 116 could be comprised of multiple communication paths using various media.

Communication network 120 communicates with network interfaces 101 and 111 over respective links 121 and 122. Links 121 and 122 could be comprised of multiple communication paths using various media. Communication network 120 could be the Internet World Wide Web or some other communication system that supports communication between user and server systems.

In some examples of the invention, user system 110 and server system 100 could be integrated together to omit the need for communication network 120. In these examples of the invention, the invention could be comprised of a user computer and a server computer located side by side and connected by a cable. In these examples of the invention, the invention could be comprised of a user computer and a server computer located in the same facility and connected over a local area network. In these examples of the invention, the invention could be comprised of a single computer system having a user interface, processing system, storage system, control software, user data software, and screen control software. Those skilled in the art will appreciate additional variations of this type that fall within the scope of the invention.

Server system 100 could be comprised of a programmed, web-based, server computer system, although those skilled in the art will appreciate that programmable or special purpose circuitry and equipment may be used. Network interface 101 could comprise a network interface card or some other communication device. Network interface 101 may be distributed among multiple communication devices. Processing system 102 could comprise a computer microprocessor, logic circuit, or some other processing device. Processing system 102 may be distributed among multiple processing devices. Storage system 103 could comprise a disk, tape, integrated circuit, server, or some other memory device. Storage system 103 may be distributed among multiple memory devices. User interface 104 could comprise a keyboard, mouse, voice recognition interface, graphical display, touch-screen, or some other type of user device.

Processing system 102 retrieves and executes software 105–107 from storage system 103. Software 105–107 could comprise an application program, firmware, or some other form of machine-readable processing instructions. When executed by processing system 102, software 105–107 directs processing system 102 to operate in accord with the invention. Control software 105 represents operating systems, networking software, database software, device drivers, and other software generally loaded onto a server. User data and screen control software 106–107 are discussed in detail below and could be integrated together or distributed among multiple pieces of software having different names. Based on this disclosure, those skilled in the art will appreciate how to modify existing server systems to make server system 100.

User system 110 could be comprised of a programmed personal computer system, although those skilled in the art will appreciate that programmable or special purpose circuitry and equipment may be used. For example, user system 110 could be a telephone, personal digital assistant, or network appliance. Network interface 111 could comprise a network interface card or some other communication device. Network interface 111 may be distributed among multiple communication devices. Processing system 112 could comprise a computer microprocessor, logic circuit, or some other processing device. Processing system 112 may be distributed among multiple processing devices. Storage system 113 could comprise a disk, tape, integrated circuit, server, or some other memory device. Storage system 113 may be distributed among multiple memory devices. User interface 114 could comprise a keyboard, mouse, voice recognition interface, graphical display, touch screen, or some other type of user device.

Processing system 112 retrieves and executes control software 115 from storage system 113. Software 115 could comprise an application program, firmware, or some other form of machine-readable processing instructions. When executed by processing system 112, software 115 directs processing system 112 to operate in accord with the invention. Control software 115 represents operating systems) browsers, networking software, database software, device drivers, and other software generally loaded onto a personal computer. Based on this disclosure, those skilled in the art will appreciate how to modify existing user systems to make user system 110.

Figure 2:
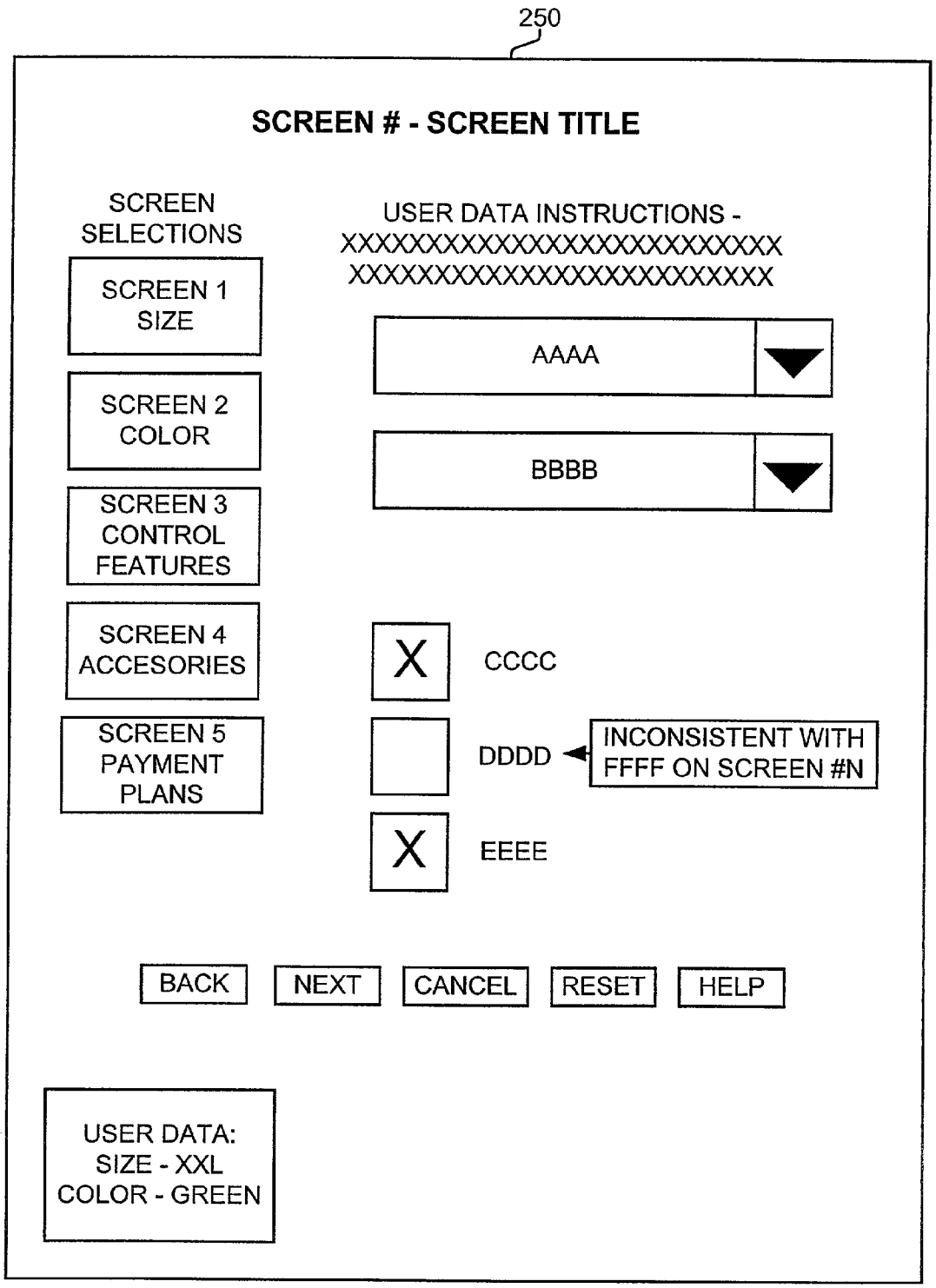
FIG. 2 illustrates a system screen in an example of the invention.

System Screen—FIG. 2

FIG. 2 illustrates system screen 250 in an example of the invention. Screen 250 is a generic example of one of the screens in the sequence. User interface 114 displays screen 250 under the direction of processing system 112, and in response to screen signals received through network interface 111. The screen signals are transferred to user system 110 by processing system 102 through network interface 101 and communication network 120.

Screen 250 includes a screen number and title, such as "SCREEN 3—CONTROL FEATURES." Screen 250 includes instructions, drop-down menu boxes, and check boxes to enter user data. Screen 250 also includes user data that was input for previous screens in the sequence. User data is typically product specification information, but could be other information. For example, user data might indicate a desired size, color, or rating for the desired product.

Consistent user data is data that is consistent with the user data for prior screens relative to at least one product— meaning that a selectable product exists that can accommodate the user data for the current screen and all previous screens. For example, if a large truck motor is selected for the first screen, then a towing package that requires the large motor and that is selected in the fifth screen would be consistent user data. In contrast, if a small truck motor is selected for the first screen, then a towing package that requires the large motor and that is selected in the fifth screen would not be consistent user data.

On FIG. 2, note that the check box for selecting user data "DDDD" has no "X" because it is no longer selectable, since as indicated in the annotation, it is inconsistent with user data for a prior screen. If desired, the user may navigate back to the prior screen and change the user data to allow the subsequent selection of "DDDD". The navigation may be accomplished by selecting the back or next buttons, or by using the screen selections menu on the left. Screens that are not available may be presented in a non-selectable fashion. Advantageously and as discussed below, screen control software 107 provides a user-friendly process that allows the user to jump back and forth among the screens in an iterative process, while user data software 106 ensures that the entered user data remains consistent.

Figure 3:
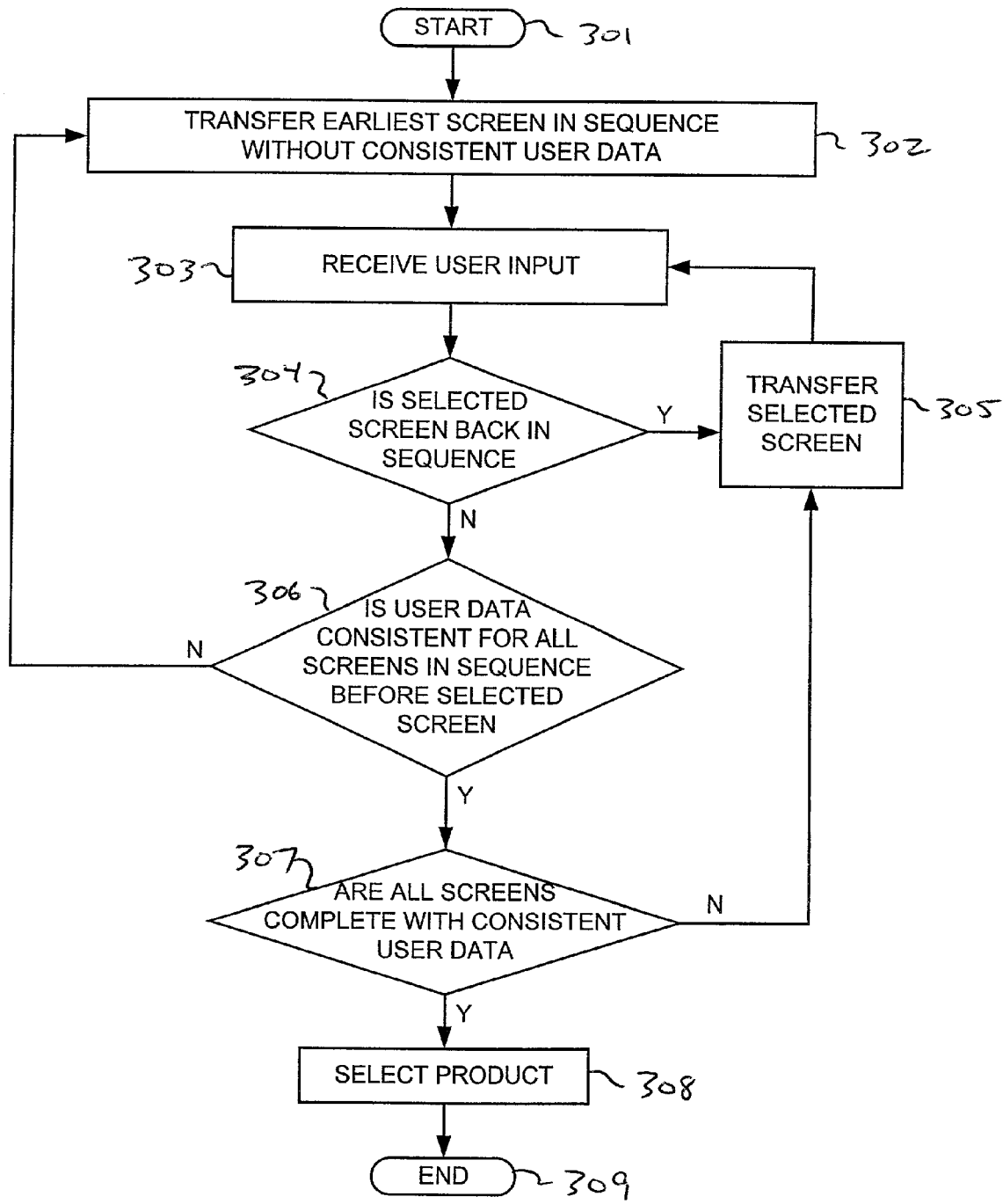
FIG. 3 illustrates system operation in an example of the invention.

System Operation—FIG. 3

FIG. 3 illustrates system operation in an example of the invention. System operation is controlled by software 106–107. Operations related to user data are handled by user data software 106, and operations related to screens are handled by screen control software 107. In the following description, distinctions between screens and screen signals or between user and user system are ignored for clarity. The reference numbers from FIG. 3 are parenthetically indicated below at corresponding points in the text.

The process starts (301) by transferring the earliest screen in the sequence that does not have consistent user data (302). In some examples of the invention, this is the first screen in the sequence, but in other examples of the invention, a pre-existing set of consistent user data is used from the start, so the last screen in the sequence would be sent. The advantages of the latter technique are discussed further below. In response to the screen, a user input is received that has a screen selection and typically also user data (303). The screen selection is from a next or back input or the result of a selection from the screen selection menu.

If the selected screen is back in the sequence from the current screen (304), then the selected screen is transferred along with all consistent user data for the selected screen and prior screens (305). For example, if the current screen is four and the selected screen is two, then screen two is transferred with the consistent user data for screens one and two. If the selected screen is not back in the sequence from the current screen (304), then the selected screen is the forward in the sequence.

If the selected screen is forward in the sequence (304), and if the user data is not consistent for all screens in the sequence prior to the selected screen (306), then the earliest screen in the sequence is transferred that does not have consistent user data (302). For example, if screens 1–3 have consistent user data, screen four has inconsistent user data, and screen five is selected, the screen four is transferred instead of screen five. Typically, a screen is not selectable if it is positioned in the sequence after a screen without consistent user data. In the above example, screen five would not be selectable, and only screens 1–4 could be selected.

If: 1) the selected screen is forward in the sequence (304), 2) the user data is consistent for all screens in the sequence prior to the selected screen (306), and 3) all screens are not complete with consistent user data (307), then the selected screen is transferred (305). If: 1) the selected screen is forward in the sequence (304), 2) the user data is consistent for all screens in the sequence prior to the selected screen (306), and 3) all screens are complete with consistent user data (307), then a product is selected based on the complete and consistent user data (308), and the process ends (309).

If desired, user data software 106 can be configured to direct processing system 102 to complete a purchase transaction for the selected product. This may use shopping cart techniques and entail the collection of user address and payment information. Processing system 102 sends an instruction to an accounting system to charge the customer based on the payment information. Processing system 102 sends an instruction to an inventory system to ship the product to the customer based on the address information.

If the process begins with a consistent pre-existing user data, then the user may simply order the product based on the pre-existing user data or jump back to any screen to make any desired changes to the pre-existing user data. If a jump back is performed, then the user may jump ahead and automatically stop at any subsequent screens where additional user data changes are required to attain a consistent set of user data. Thus, the use of pre-existing user data coupled with the jump back and jump ahead features provides the user with an efficient and advanced tool for selecting a product.

Coriolis Flow Meter Product Selection—FIGS. 4–13

Coriolis flow meter product selection is described in U.S. patent application Ser. No. 09/725,550, entitled "REMOTE CORIOLIS SIZING AND ORDERING SYSTEM", filed on Nov. 29, 2000, and which is hereby incorporated by reference into this application. A Coriolis mass flowmeter measures mass flow and other information of materials flowing through a flow tube in the flowmeter. Exemplary Coriolis flowmeters are disclosed in U.S. Pat. Nos. 4,109,524 of Aug. 29, 1978, 4,491,025 of Jan. 1, 1985, and Re. 31,450 of Feb. 11, 1982, all to J. E. Smith et al. These flowmeters have one or more flow tubes of straight or curved configuration. Each flow tube configuration in a Coriolis mass flowmeter has a set of natural vibration modes, which may be of a simple bending, torsional or coupled type. Each flow tube is driven to oscillate at resonance in one of these natural modes. Material flows into the flowmeter from a connected pipeline on the inlet side of the flowmeter, is directed through the flow tube or flow tubes, and exits the flowmeter through the outlet side of the flowmeter. The material flowing through the pipeline may be gas, liquid, solid, and any combination of these three. The natural vibration modes of the vibrating, material filled system are defined in part by the combined mass of the flow tubes and the material flowing within the flow tubes.

When there is no flow through the flowmeter, all points along the flow tube oscillate due to an applied driver force with identical phase or small initial fixed phase offset which can be corrected. As material begins to flow, Coriolis forces cause each point along the flow tube to have a different phase. The phase on the inlet side of the flow tube lags the driver, while the phase on the outlet side of the flow tube leads the driver. Pick-offs on the flow tube(s) produce sinusoidal signals representative of the motion of the flow tube(s). Signals output from the pick-offs are processed to determine the phase difference between the pick-offs. The phase difference between two pick-off signals is proportional to the mass flow rate of material through the flow tube(s).

Figure 4:
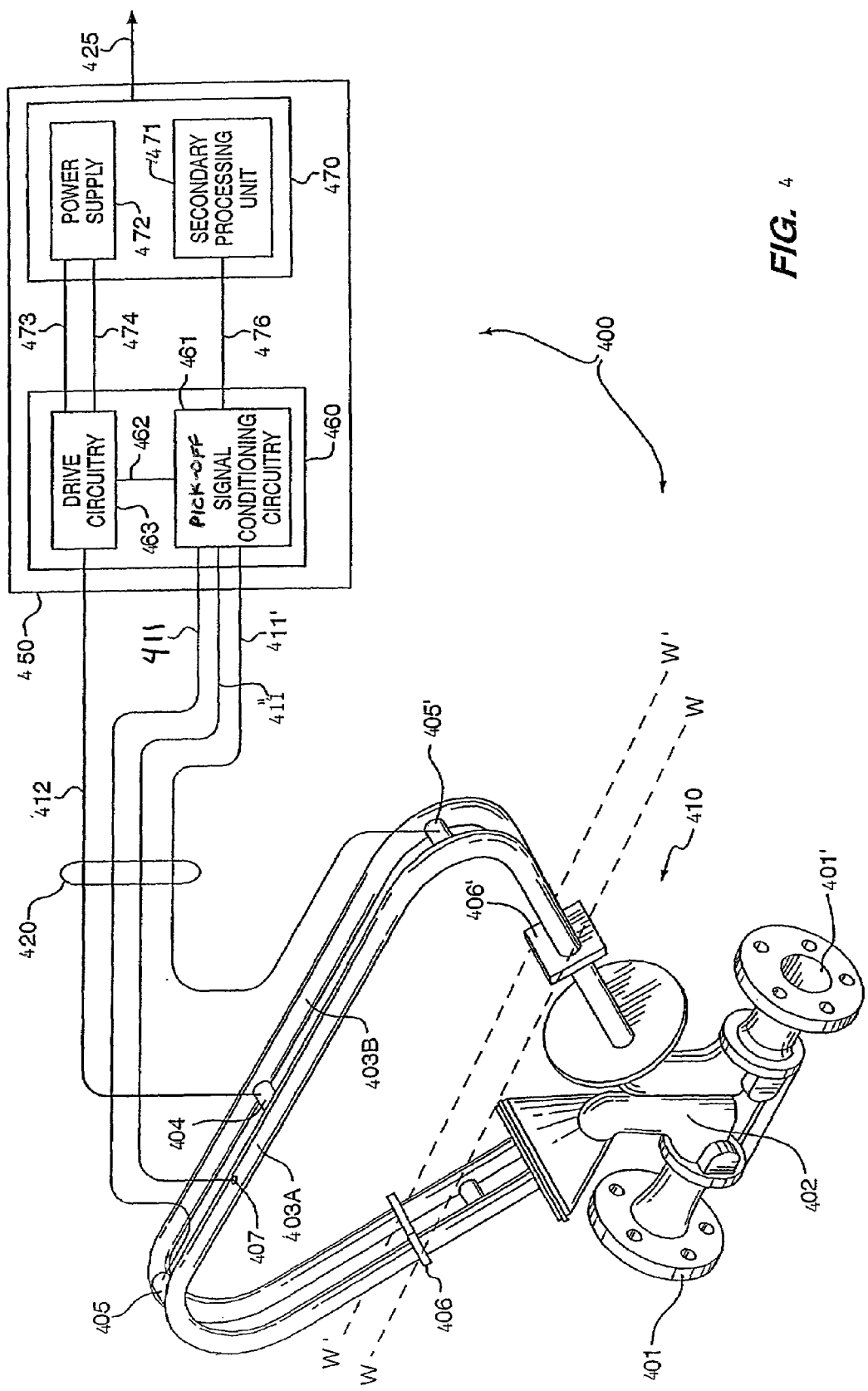
FIG. 4 illustrates a Coriolis mass flowmeter in an example of the invention.
Figure 5:
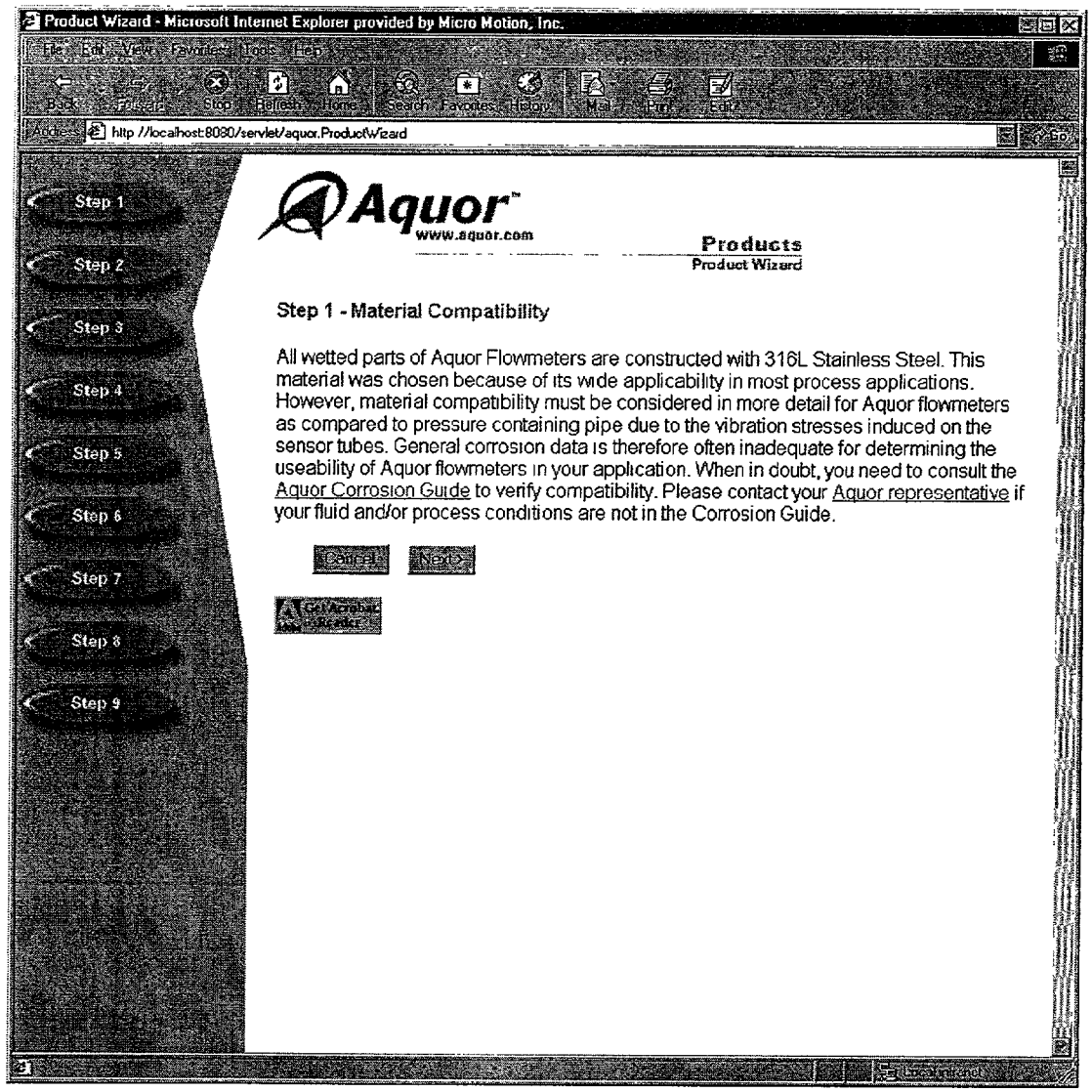
FIG. 5 illustrates a screen for Coriolis flowmeter product selection in an example of the invention.
Figure 6:
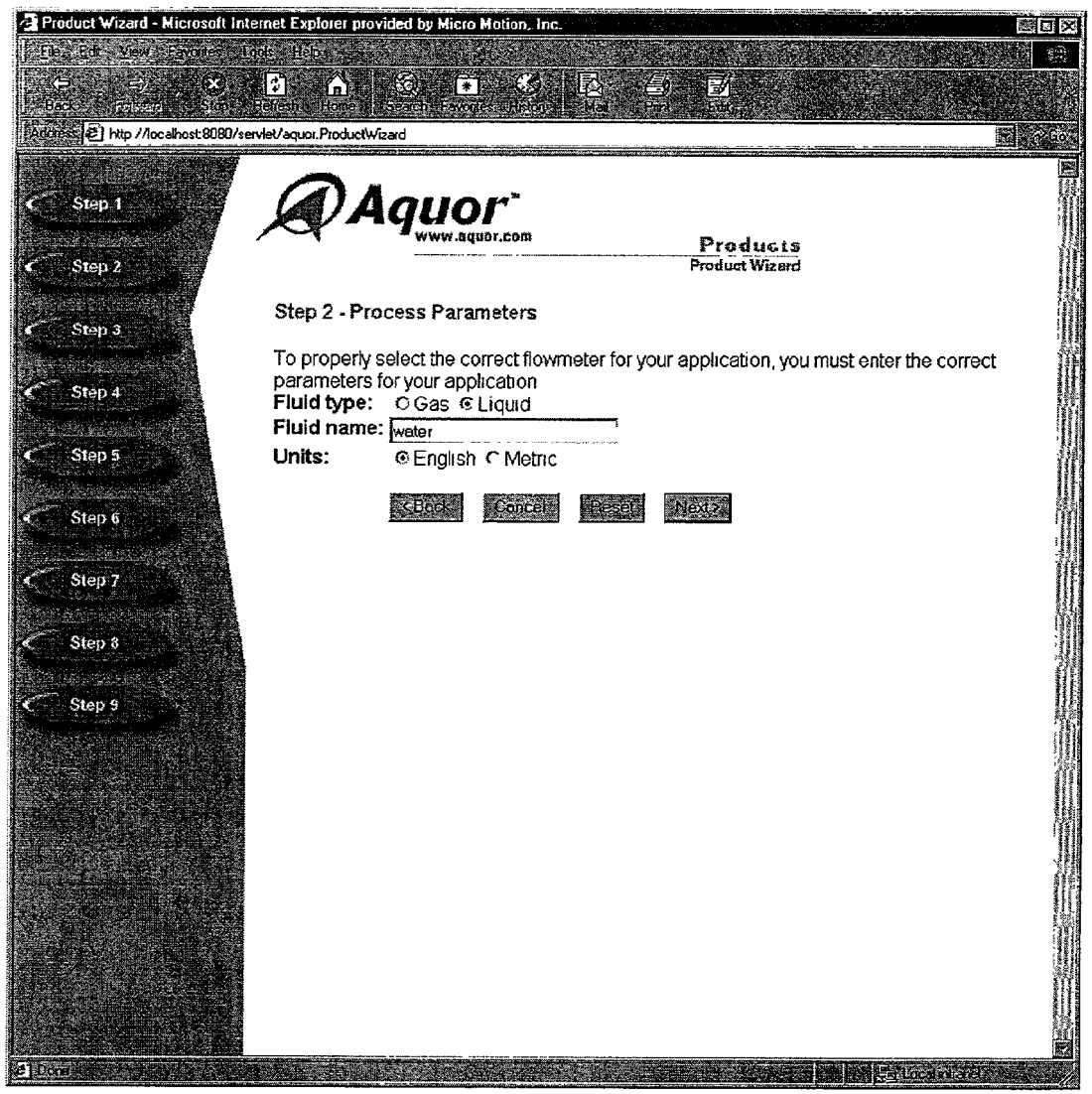
FIG. 6 illustrates a screen for Coriolis flowmeter product selection in an example of the invention.
Figure 7:
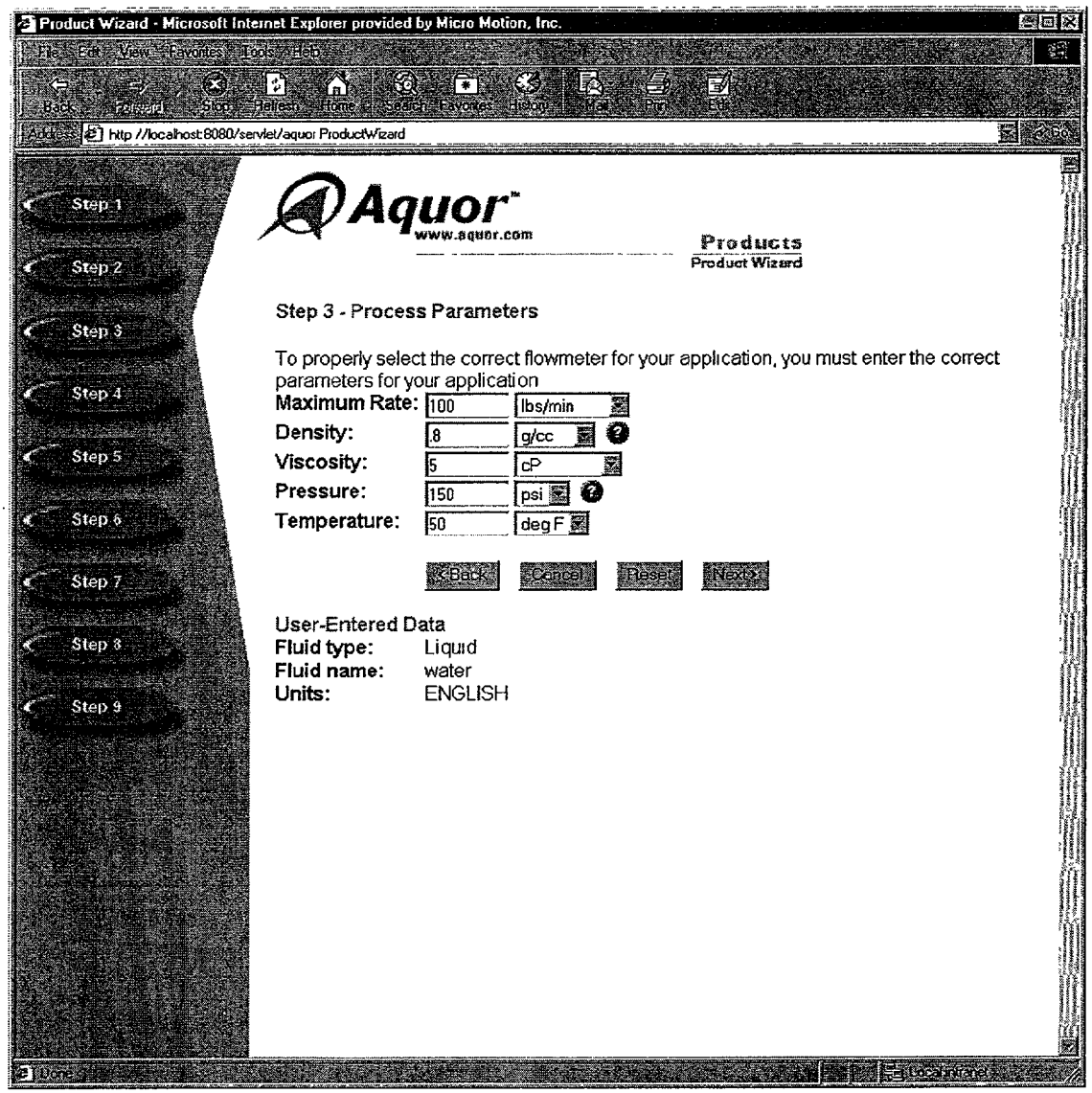
FIG. 7 illustrates a screen for Coriolis flowmeter product selection in an example of the invention.
Figure 8:
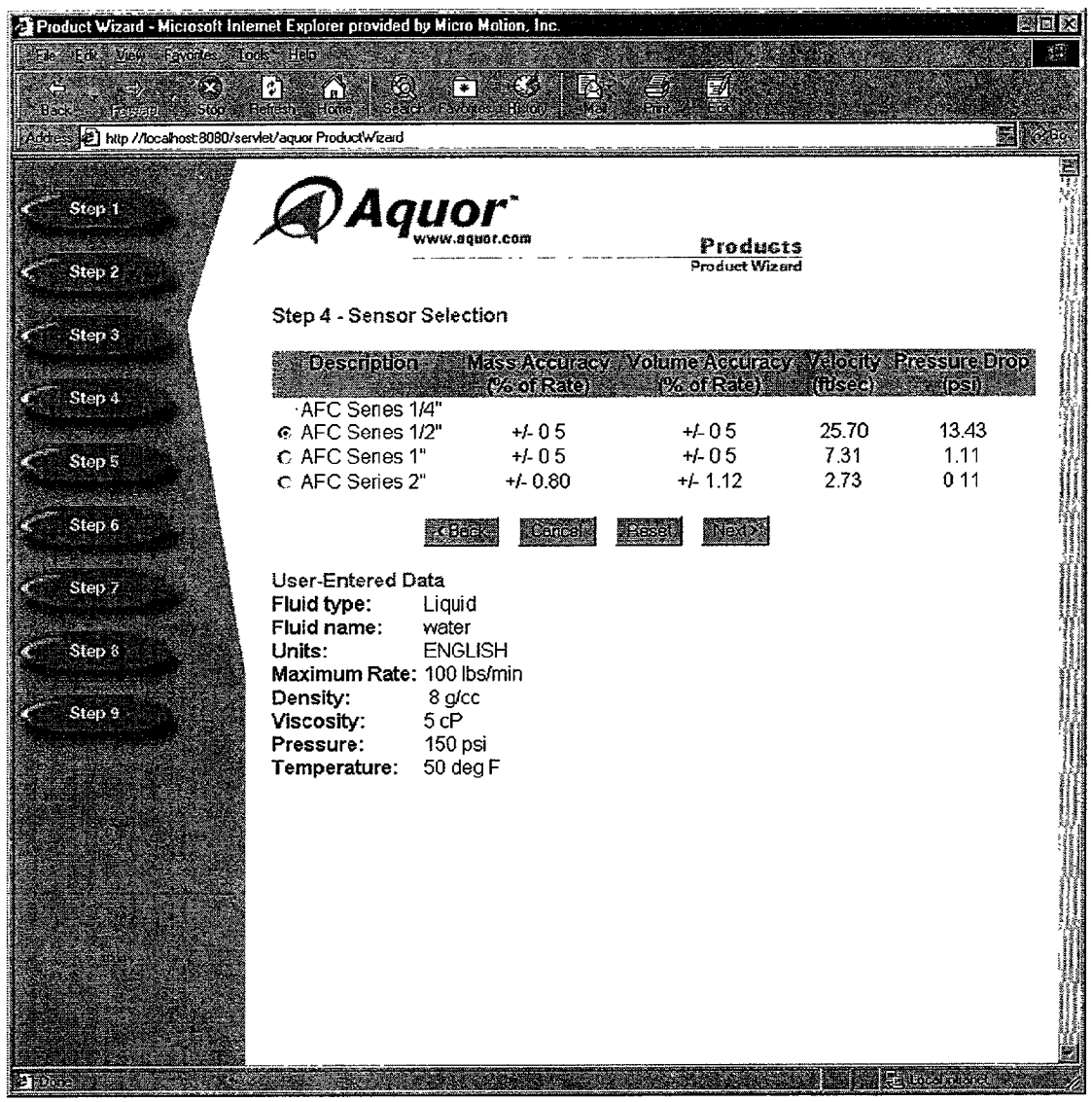
FIG. 8 illustrates a screen for Coriolis flowmeter product selection in an example of the invention.
Figure 9:
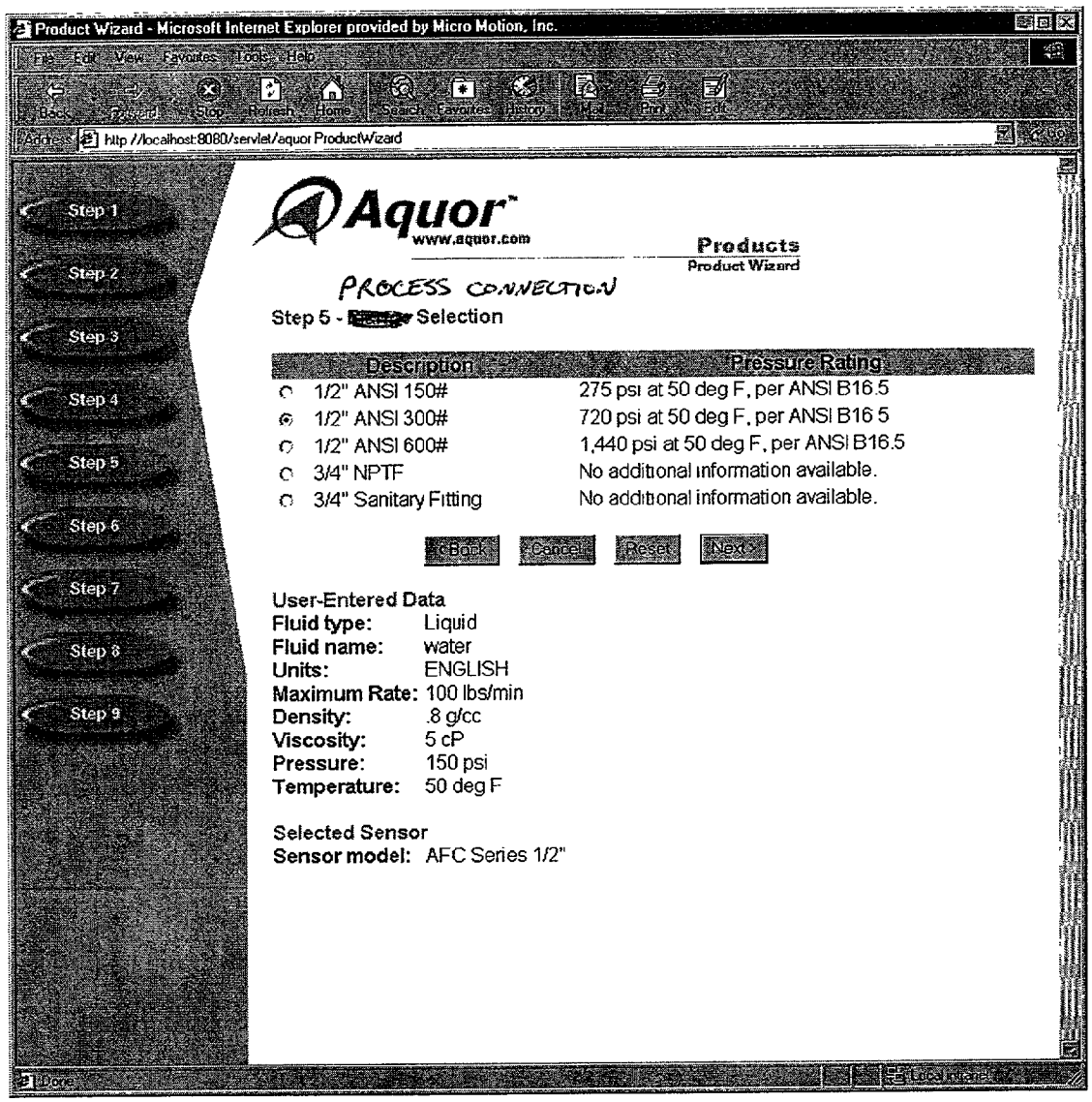
FIG. 9 illustrates a screen for Coriolis flowmeter product selection in an example of the invention.
Figure 10:
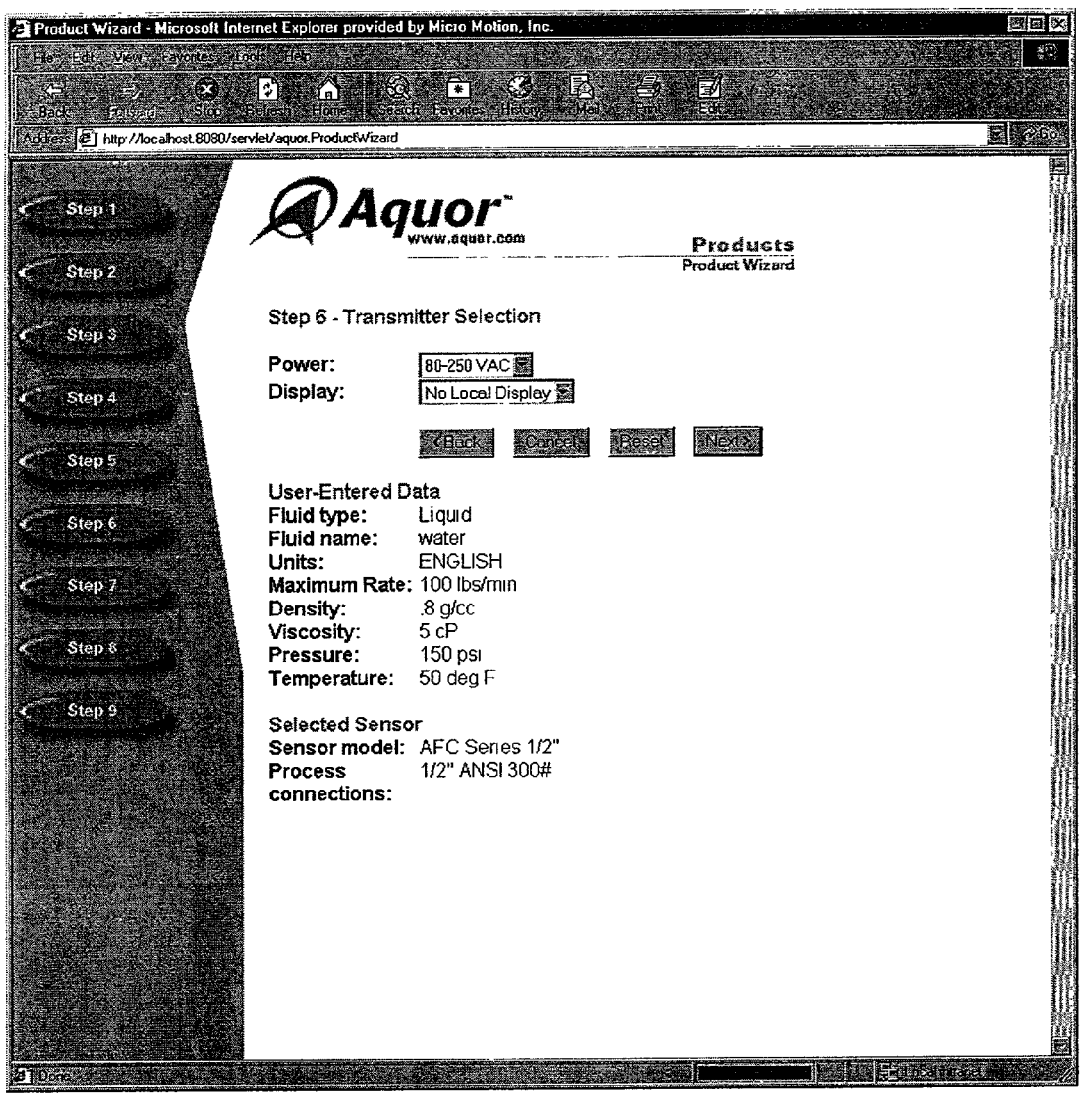
FIG. 10 illustrates a screen for Coriolis flowmeter product selection in an example of the invention.
Figure 11:
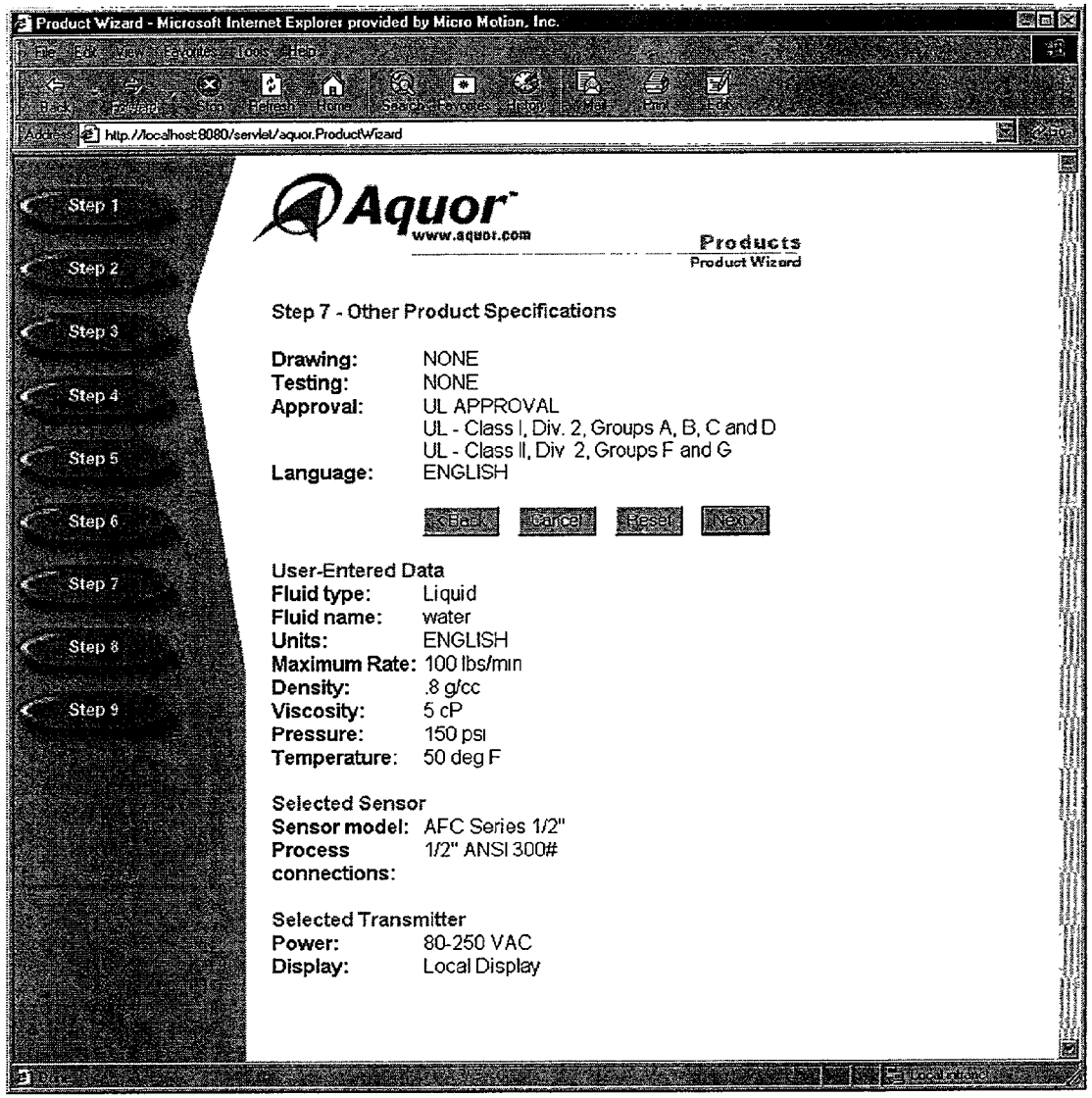
FIG. 11 illustrates a screen for Coriolis flowmeter product selection in an example of the invention.
Figure 12:
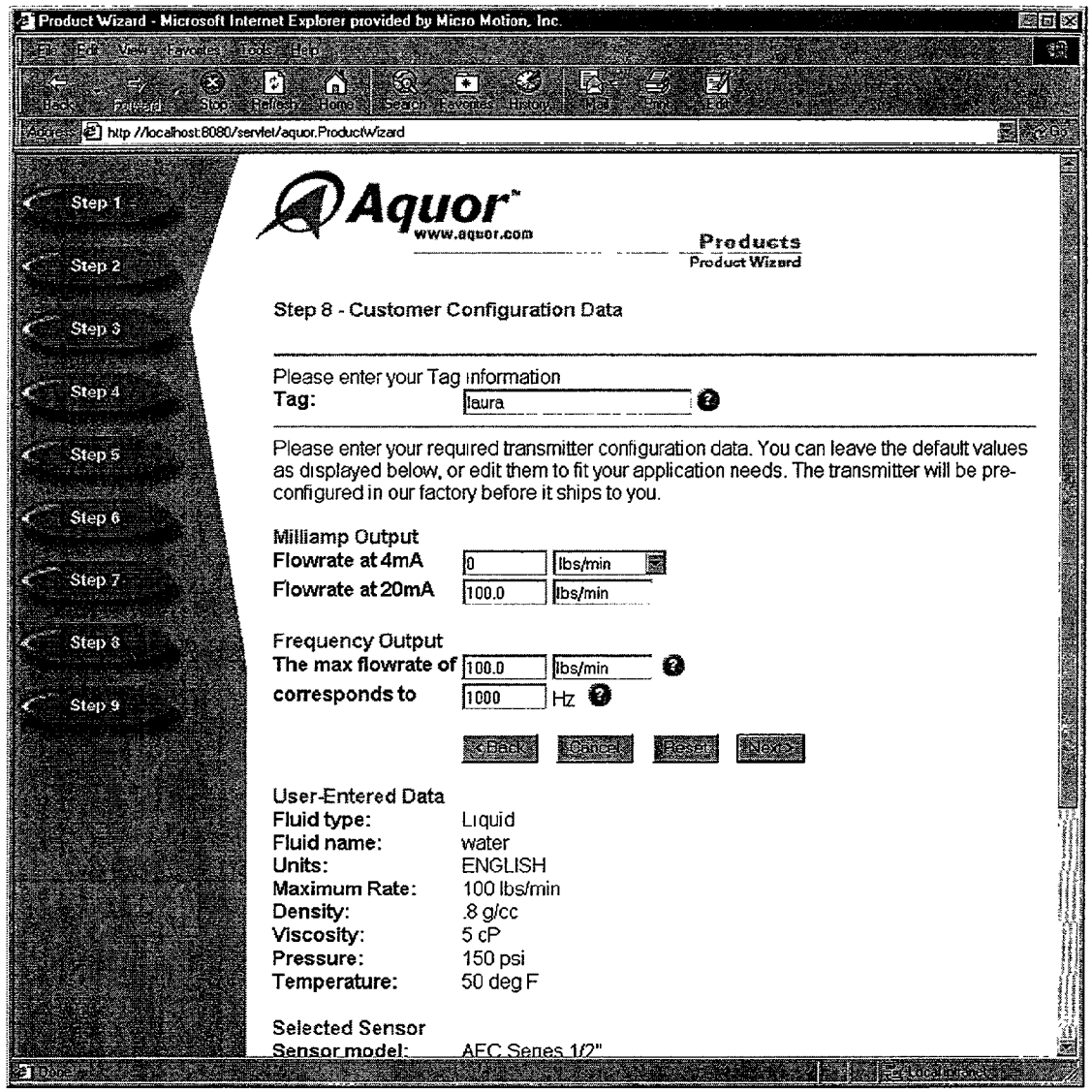
FIG. 12 illustrates a screen for Coriolis flowmeter product selection in an example of the invention.
Figure 13:
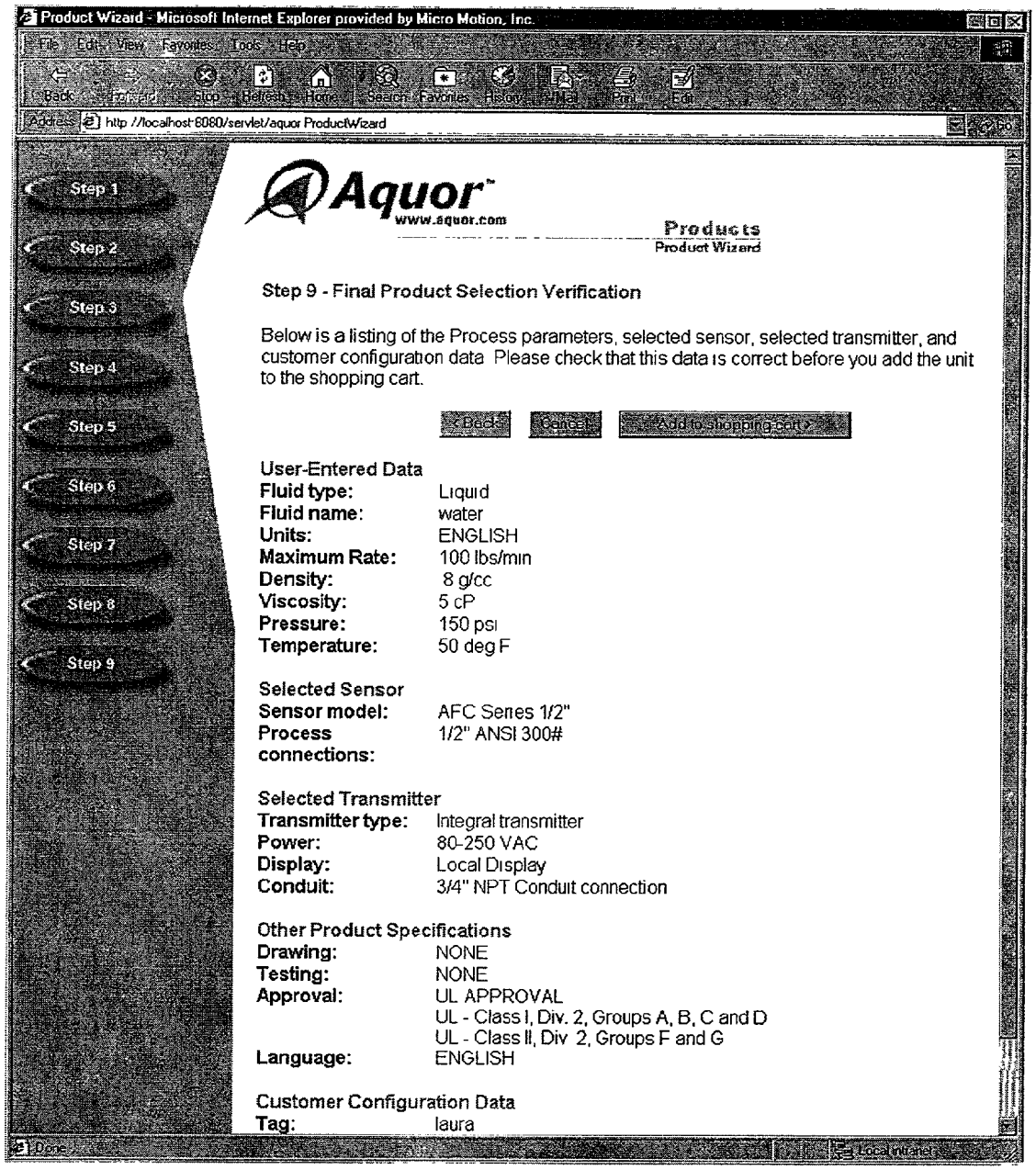
FIG. 13 illustrates a screen for Coriolis flowmeter product selection in an example of the invention.

FIG. 4 illustrates Coriolis mass flowmeter 400 in an example of the invention. Coriolis flowmeter 400 may provide a mass flow rate or other process parameter. Coriolis flowmeter 400 includes a flowmeter assembly 410 and meter electronics 450. Meter electronics 450 are connected to a meter assembly 410 via leads 420 to provide density, mass-flow-rate, volume-flow-rate, and totalized mass-flow rate information over a path 475.

A Coriolis flowmeter structure is described although it should be apparent to those skilled in the art that the present invention could be practiced in conjunction with any apparatus having a vibrating flow tube to measure properties of material flowing through the flow tube. A second example of such an apparatus is a vibrating tube densitometer which does not have the additional measurement capability provided by Coriolis mass flowmeters.

Meter assembly 410 includes a pair of process connections 401 and 401', manifold 402 and flow tubes 403A and 403B. Driver 404, pick-offs 405 and 405', and temperature sensor 407 are connected to flow tubes 403A and 403B. Brace bars 406 and 406' serve to define the axis W and W' about which each flow tube oscillates.

When Coriolis flowmeter 400 is inserted into a pipeline system (not shown) which carries the process material that is being measured, material enters flowmeter assembly 410 through process connection 401, passes through manifold 402 where the material is directed to enter flow tubes 403A and 403B. The material then flows through flow tubes 403A and 403B and back into manifold 402 from where it exits meter assembly 410 through process connection 401'.

Flow tubes 403A and 403B are selected and appropriately mounted to the manifold 402 so as to have substantially the same mass distribution, moments of inertia and elastic modules about bending axes W—W and W'—W', respectively. The flow tubes 403A–403B extend outwardly from the manifold in an essentially parallel fashion.

Flow tubes 403A–403B are driven by driver 404 in phase opposition about their respective bending axes W and W' and at what is termed the first out of phase bending mode of the flowmeter. Driver 404 may comprise any one of many well known arrangements, such as a magnet mounted to flow tube 403A and an opposing coil mounted to flow tube 403B and through which an alternating current is passed for vibrating both flow tubes. A suitable drive signal is applied by meter electronics 450 to driver 404 via path 412.

Pick-offs 405 and 405' are affixed to at least one of flow tubes 403A and 403B on opposing ends of the flow tube to measure oscillation of the flow tubes. As the flow tube 403A–403B vibrates, pick-offs 405–405' generate a first pick-off signal and a second pick-off signal. The first and second pick-off signals are applied to paths 411 and 411'. The driver velocity signal is applied to path 412.

Temperature sensor 407 is affixed to at least one flow tube 403A and/or 403B. Temperature sensor 407 measures the temperature of the flow tube in order to modify equations for the temperature of the system. Path 411" carries temperature signals from temperature sensor 407 to meter electronics 450.

Meter electronics 450 receives the first and second pick-off signals appearing on paths 411 and 411', respectively. Meter electronics 450 processes the first and second velocity signals to compute the mass flow rate, the density, or other property of the material passing through flowmeter assembly 410. This computed information is applied by meter electronics 450 over path 425 to a utilization means (not shown).

It is known to those skilled in the art that Coriolis flowmeter 400 is quite similar in structure to a vibrating tube densitometer. Vibrating tube densitometers also utilize a vibrating tube through which fluid flows or, in the case of a sample-type densitometer, within which fluid is held. Vibrating tube densitometers also employ a drive system for exciting the flow tube to vibrate. Vibrating tube densitometers typically utilize only single feedback signal since a density measurement requires only the measurement of frequency and a phase measurement is not necessary. The descriptions of the present invention herein apply equally to vibrating tube densitometers.

In Coriolis flowmeter 400, the meter electronics 450 are physically divided into 2 components a host system 470 and a signal conditioner 460. In conventional meter electronics, these components are housed in one unit.

Signal conditioner 460 includes drive circuitry 463 and pick-off signal conditioning circuitry 461. One skilled in the art will recognize that in actuality drive circuitry 463 and pick-off conditioning circuitry 461 may be separate analog circuits or may be separate functions provided by a digital signal processor or other digital components. Drive circuitry 463 generates a drive signal and applies an alternating drive current to driver 404 via path 412 of path 420. The circuitry of the present invention may be included in drive circuitry 463 to provide an alternating current to driver 404.

In actuality, path 412 is a first and a second lead. Drive circuitry 463 is communicatively connected to pick-off signal conditioning circuitry 461 via path 462. Path 462 allows drive circuitry to monitor the incoming pick-off signals to adjust the drive signal. Power to operate drive circuitry 463 and pick-off signal conditioning circuitry 461 is supplied from host system 470 via a first wire 473 and a second wire 474. First wire 473 and second wire 474 may be a part of a conventional 2-wire, 4-wire cable, or a portion of a multi-pair cable.

Pick-off signal conditioning circuitry 461 receives input signals from first pick-off 405, second pick-off 405', and temperature sensor 407 via paths 411, 411' and 411". Pick-off signal conditioning circuitry 461 determines the frequency of the pick-off signals and may also determine properties of a material flowing through flow tubes 403A–403B. After the frequency of the input signals from pick-offs 405–405' and properties of the material are determined, parameter signals carrying this information are generated and transmitted to a secondary processing unit 471 in host system 470 via path 476. In a preferred embodiment, path 476 includes 2 leads. However, one skilled in the art will recognize that path 476 may be carried over first wire 473 and second wire 474 or over any other number of wires.

Host system 470 includes a power supply 472 and secondary processing unit 471. Power supply 472 receives electricity from a source and converts the received electricity to the proper power needed by the system. Secondary processing unit 471 receives the parameter signals from pick-off signal conditioning circuitry 461 and then may perform processes needed to provide properties of the material flowing through flow tubes 403A–403B needed by a user. Such properties may include but are not limited to density, mass flow rate, and volumetric flow rate.

FIGS. 5–13 illustrate screens for Coriolis flowmeter product selection in an example of the invention. The screens have titles and user data instructions. The screens collect user data such as: fluid name, fluid flow rate, fluid density, fluid viscosity, fluid pressure, fluid temperature, flowmeter sensor type, flowmeter process connection type, and flowmeter transmitter type. The screens have a screen selection menu, as well as, back, next, cancel, reset, and help selections.

In some examples of the invention, processes other than product selection could be accomplished by the invention if the other processes also use a sequence of user screens to collect a consistent set of user data. Thus, the invention is illustrated by the above examples and teachings, but the invention is limited only by the claims and their equivalents.

What is claimed is:

1. A software system for directing product selection over a communication network where a user system receives screen signals from the communication network and displays corresponding screens to a user, the user provides user inputs to the user system in response to the screens, the user system transfers corresponding user input signals over the communication network, and the screens are arranged in a sequence, the software system comprising:
   user data software configured to direct a processing system to process user data from the user input signals to determine if the user data is consistent data that is consistent with at least one of a plurality of products;
   screen control software configured to direct the processing system to process user screen selections from the user input signals, transfer a selected one of the screen signals corresponding to a selected one of the screens if the selected one of the screens is backward in the sequence or if all previous ones of the screens in the sequence prior to the selected one of the screens have the consistent data, and to transfer to the user system over the communication network an earliest one of the screen signals corresponding to an earliest one of the screens in the sequence that does not have the consistent data if the selected one of the screens is forward in the sequence and if the previous ones of the screens in the sequence prior to the selected one of the screens do not all have the consistent data; and
   a storage system that stores the user data software and the screen control software.

2. The software system of claim 1 wherein the screen control software is configured to direct the processing system to include in the screen signals the consistent data for a current one of the screens corresponding to a current one of the screen signals being transferred and the consistent data for earlier ones of the screens in the sequence.

3. The software system of claim 1 wherein:
   the user data software is configured to direct the processing system to remove from product selection consideration non-selectable ones of the products that are inconsistent with the consistent data; and
   the screen control software is configured to direct the processing system to modify the screens signals to indicate user data selections that are inconsistent with selectable ones of the products that remain under product selection consideration.

4. The software system of claim 1 wherein the user data software is configured to direct the processing system to start with a pre-existing set of the consistent data.

5. The software system of claim 1 wherein the user data software is configured to direct the processing system to complete a purchase transaction for a selected one of the products.

6. The software system of claim 1 wherein the products comprise flow meters.

7. The software system of claim 1 wherein the products comprise Coriolis flow meters.

8. The software system of claim 1 wherein the products comprise densitometers.

9. The software system of claim 1 wherein the user data indicates a fluid name.

10. The software system of claim 1 wherein the user data indicates at least one of: fluid flow rate, fluid density, fluid viscosity, fluid pressure, and fluid temperature.

11. The software system of claim 1 wherein the user data indicates a flowmeter sensor type.

12. The software system of claim 1 wherein the user data indicates a flowmeter process, connection type.

13. The software system of claim 1 wherein the user data indicates a flowmeter transmitter type.

14. A server system for directing product selection over a communication network where a user system receives screen signals from the communication network and displays corresponding screens to a user, the user provides user inputs to the user system in response to the screens, the user system transfers corresponding user input signals over the communication network, and the screens are arranged in a sequence, the server system comprising:
   a network interface configured to transfer the screen signals to the communication network and to receive the user input signals from the communication network; and
   a processing system configured to process user data from the user input signals to determine if the user data is consistent data that is consistent with at least one of a plurality of products, process user screen selections from the user input signals, transfer a selected one of the screen signals corresponding to a selected one of the screens if the selected one of the screens is backward in the sequence or if all previous ones of the screens in the sequence prior to the selected one of the screens have the consistent data, and to transfer to the user system over the communication network an earliest one of the screen signals corresponding to an earliest one of the screens in the sequence that does not have the consistent data if the selected one of the screens is forward in the sequence and if the previous ones of the screens in the sequence prior to the selected one of the screens do not all have the consistent data.

15. The server system of claim 14 wherein the processing system is configured to include in the screen signals the consistent data for a current one of the screens corresponding to a current one of the screen signals being transferred and the consistent data for earlier ones of the screens in the sequence.

16. The server system of claim 14 wherein the processing system is configured to remove from product selection consideration non-selectable ones of the products that are inconsistent with the consistent data, and modify the screens signals to indicate user data selections that are inconsistent with selectable ones of the products that remain under product selection consideration.

17. The server system of claim 14 wherein the processing system is configured to start with a pre-existing set of the consistent data.

18. The server system of claim 14 wherein the processing system is configured to complete a purchase transaction for a selected one of the products.

19. The server system of claim 14 wherein the products comprise flow meters.

20. The server system of claim 14 wherein the products comprise Coriolis flow meters.

21. The sewer system of claim 14 wherein the products comprise densitometers.

22. The saver system of claim 14 wherein the user data indicates a fluid name.

23. The server system of claim 14 wherein the user data indicates at least one of: fluid flow rate, fluid density, fluid viscosity, fluid pressure, and fluid temperature.

24. The server system of claim 14 wherein the user data indicates a flowmeter sensor type.

25. The server system of claim 14 wherein the user data indicates a flowmeter process connection type.

26. The server system of claim 14 wherein the user data indicates a flowmeter transmitter type.

27. A method of operating a server system for directing product selection over a communication network where a user system receives screen signals from the communication network and displays corresponding screens to a user, the user provides user inputs to the user system in response to the screens, the user system transfers corresponding user input signals over the communication network, and the screens are arranged in a sequence, the method comprising:
   processing user data from the user input signals to determine if the user data is consistent data that is consistent with at least one of a plurality of products;
   processing user screen selections from the user input signals;
   transferring a selected one of the screen signals corresponding to a selected one of the screens if the selected one of the screens is backward in the sequence or if all previous ones of the screens in the sequence prior to the selected one of the screens have the consistent data; and
   transferring to the user system over the communication network an earliest one of the screen signals corresponding to an earliest one of the screens in the sequence that does not have the consistent data if the selected one of the screens is forward in the sequence and if the previous ones of the screens in the sequence prior to the selected one of the screens do not all have the consistent data.

28. The method of claim 27 further comprising including in the screen signals the consistent data for a current one of the screens corresponding to a current one of the screen signals being transferred and the consistent data for earlier ones of the screens in the sequence.

29. The method of claim 27 further comprising removing from product selection consideration non-selectable ones of the products that are inconsistent with the consistent data, and modifying the screens signals to indicate user data selections that are inconsistent with selectable ones of the products that remain under product selection consideration.

30. The method of claim 27 further comprising starting the method with a pre-existing set of the consistent data.

31. The method of claim 27 further comprising completing a purchase transaction for a selected one of the products.

32. The method of claim 27 wherein the products comprise flow meters.

33. The method of claim 27 wherein the products comprise Coriolis flow meters.

34. The method of claim 27 wherein the products comprise densitometers.

35. The meted of claim 27 wherein the user data indicates a fluid name.

36. The method of claim 27 wherein the user data indicates at least one of: fluid flow rate, fluid density, fluid viscosity, fluid pressure, and fluid temperature.

37. The method of claim 27 wherein the user data indicates a flowmeter sensor type.

38. The method of claim 27 wherein the user data indicates a flowmeter process connection type.

39. The method of claim 27 wherein the user data indicates a flowmeter transmitter type.

* * * * *

UNITED STATES PATENT AND TRADEMARK OFFICE
CERTIFICATE OF CORRECTION

| | | |
|---|---|---|
| PATENT NO. | : 7,233,917 B2 | Page 1 of 1 |
| APPLICATION NO. | : 09/845149 | |
| DATED | : June 19, 2007 | |
| INVENTOR(S) | : John R. Bugarin and James F. Mackin, III | |

It is certified that error appears in the above-identified patent and that said Letters Patent is hereby corrected as shown below:

Column 13, line 8, replace "sewer" with -- server--; line 10, replace "saver" with --server--.

Column 14, line 28, replace "meted" with --method--.

Signed and Sealed this

Fourth Day of December, 2007

JON W. DUDAS
*Director of the United States Patent and Trademark Office*